(12) United States Patent
Inglis et al.

(10) Patent No.: US 12,056,363 B2
(45) Date of Patent: Aug. 6, 2024

(54) SYSTEMS AND METHODS FOR RELOCATING DATA IN A PERSISTENT STORAGE DEVICE

(71) Applicant: Daedalus Cloud LLC, Croton-on-Hudson, NY (US)

(72) Inventors: Stuart John Inglis, Hamilton (NZ); Sheridan John Lambert, Hamilton (NZ); Adam Gworn Kit Fleming, Hamilton (NZ); Matthew Sylvain Lazaro, Leamington (NZ); Herbert Dennis Hunt, Darian, CT (US); Dmitry Lapik, Te Awamutu (NZ); Pradeep Balakrishnan, Sunnyvale, CA (US); Rafael John Patrick Shuker, Hamilton (NZ)

(73) Assignee: Daedalus Cloud LLC, Croton-on-Hudson, NY (US)

( * ) Notice: Subject to any disclaimer, the term of this patent is extended or adjusted under 35 U.S.C. 154(b) by 22 days.

(21) Appl. No.: 18/085,192

(22) Filed: Dec. 20, 2022

(65) Prior Publication Data

US 2023/0195319 A1 Jun. 22, 2023

Related U.S. Application Data

(60) Provisional application No. 63/292,040, filed on Dec. 21, 2021.

(51) Int. Cl.
*G06F 3/06* (2006.01)
*G06F 12/0802* (2016.01)

(52) U.S. Cl.
CPC .......... *G06F 3/0613* (2013.01); *G06F 3/0647* (2013.01); *G06F 3/0659* (2013.01); *G06F 3/0689* (2013.01); *G06F 12/0802* (2013.01); *G06F 2212/1016* (2013.01)

(58) Field of Classification Search
CPC .... G06F 3/0613; G06F 3/0616; G06F 3/0644; G06F 3/0647; G06F 3/0659; G06F 3/0685; G06F 3/0688; G06F 3/0689; G06F 12/0802; G06F 12/0868; G06F 2212/1016
See application file for complete search history.

(56) References Cited

U.S. PATENT DOCUMENTS

| | | | |
|---|---|---|---|
| 8,621,145 B1 * | 12/2013 | Kimmel | G06F 12/0246 711/E12.019 |
| 8,909,829 B1 * | 12/2014 | Thangapalam | G06F 3/0685 710/62 |
| 2014/0189209 A1 | 7/2014 | Sinclair et al. | |
| 2018/0307598 A1 * | 10/2018 | Fischer | G06F 3/0643 |
| 2020/0073818 A1 | 3/2020 | Inglis et al. | |
| 2021/0311652 A1 | 10/2021 | Wang et al. | |
| 2021/0373761 A1 | 12/2021 | Karr et al. | |

OTHER PUBLICATIONS

May 9, 2023—Extended European Search Report—EP 22215191.2.
Anonymous: "Hierarchical storage management—Wikipedia", Mar. 7, 2016 (Mar. 7, 2016), XP055642763, Retrieved from the Internet: URL:https://en.wikipedia.org/w/index.php?title=Hierarchical_storage_management&oldid=708838270.

* cited by examiner

*Primary Examiner* — Larry T MacKall
(74) *Attorney, Agent, or Firm* — Ascenda Law Group, PC

(57) ABSTRACT

In some embodiments, there is provided a system which allows data to be received into a placement intelligence. After the data is analyzed, the data is written to a persistent storage device. Subsequently, the data may be written. Periodically, self-optimization may occur to improve read speeds or other metrics.

16 Claims, 10 Drawing Sheets

SYSTEMS AND METHODS FOR RELOCATING DATA IN A PERSISTENT STORAGE DEVICE

RELATED APPLICATIONS

This application is a non-provisional of U.S. Provisional Application No. 63/292,040, filed Dec. 21, 2021, herein incorporated by reference in its entirety for all purposes.

FIELD OF THE INVENTION

This relates to methods of arranging data on a persistent storage device.

BACKGROUND

Data is stored on a persistent storage device. When data is to be written, a storage controller receives the write request and causes the data to be written onto the persistent storage device. When data is to be read, the storage controller receives the read request and returns the data.

SUMMARY OF THE INVENTION

In a first example, there is provided a method of writing data to a persistent storage device comprising an array of drives, the method comprising: receiving a request to write data; determining metadata; selectively writing the data to a physical location on the persistent storage device based on the metadata, wherein the physical location corresponds to a next free block in a sequence of blocks on a drive in the array of drives.

In a second example, the first example is provided wherein the metadata comprises an affinity of the data.

In a third example, the second example is provided wherein selectively writing the data to a physical location on the persistent storage device based on the metadata comprises writing data with the same affinity to a contiguous region in the persistent storage device.

In a fourth example, the third example is provided wherein the affinity is at least a function of one or more of a request time, a process identifier, and a CPU identifier.

In a fifth example, the third example is provided wherein the contiguous region is on an array of hard disk drives.

In a sixth example, the first example is provided wherein the metadata comprises a priority value of the data.

In a seventh example, the sixth example is provided wherein selectively writing the data to a physical location on the persistent storage device based on the metadata comprises writing data with a high priority value to a fast zone in the persistent storage device, wherein the fast zone is on an array of hard disk drives.

In an eighth example, the sixth example is provided wherein selectively writing the data to a physical location on the persistent storage device based on the metadata comprises writing data with a high priority value to a high tier in the persistent storage device, wherein the high tier comprises an array of solid-state drives.

In a ninth example, the first example is provided wherein selectively writing the data to a physical location on the persistent storage device based on the metadata comprises distributing data with affinity across multiple dies on multiple solid-state drives.

In a tenth example, the first example is provided wherein the request to write data is a request to write data to a virtual location and comprises a logical block addressing value, the method further comprising: recording a mapping from the virtual location to the physical location, wherein the virtual location and the physical location are not correlated.

In an eleventh example, there is provided a method of relocating data in a persistent storage device comprising an array of drives, the method comprising: determining a condition for data relocation is met; determining metadata; and sequentially relocating the data, based on the metadata, from a first physical location in the persistent storage device to a second, different physical location in the persistent storage device.

In a twelfth example, the eleventh example is provided wherein relocating the data improves read performance.

In a thirteenth example, the eleventh example is provided wherein determining a condition for data relocation is met is based on at least one of a number of gaps on the persistent storage device exceeding a predetermined threshold; an activity level of the persistent storage device falling below a threshold; a free capacity of the persistent storage device falling below a threshold, and a time period having passed.

In a fourteenth example, the eleventh example is provided wherein determining metadata comprises determining an expected read pattern.

In a fifteenth example, the fourteenth example is provided wherein sequentially relocating the data, based on the metadata, from a first physical location in the persistent storage device to a second, different physical location in the persistent storage device comprises: reading data matching the expected read pattern into memory; and sequentially writing the data matching the expected read pattern to a contiguous region in the persistent storage device.

In a sixteenth example, the fourteenth example is provided wherein sequentially relocating the data, based on the metadata, from a first physical location in the persistent storage device to a second, different physical location in the persistent storage device comprises: reading data matching the expected read pattern into memory; and distributing the data matching the expected read pattern across multiple dies on multiple solid-state drives.

In a seventeenth example, the eleventh example is provided wherein determining metadata comprises determining a priority value.

In an eighteenth example, the seventeenth example is provided wherein sequentially relocating the data, based on the metadata, from a first physical location in the persistent storage device to a second, different physical location in the persistent storage device comprises: reading data for which the priority value was determined into memory, and sequentially writing the data for which the priority value was determined to a fast zone, wherein the fast zone is on an array of hard disk drives.

In a nineteenth example, the seventeenth example is provided wherein sequentially relocating the data, based on the metadata, from a first physical location in the persistent storage device to a second, different physical location in the persistent storage device comprises: reading data for which the priority value was determined into memory; and sequentially writing the data for which the priority value was determined to a high tier in the persistent storage device, wherein the high tier comprises an array of solid-state drives.

In a twentieth example, the eleventh example is provided further comprising updating a mapping from a virtual location to the first physical location to map between the virtual location and the second physical location.

BRIEF DESCRIPTION OF THE DRAWINGS

The description is framed by way of example with reference to the drawings which show certain embodiments.

However, these drawings are provided for illustration only, and do not exhaustively set out all embodiments.

DETAILED DESCRIPTION

In some embodiments, there is provided a system which allows data to be received into a placement intelligence. After the data is analyzed, the data is written to a persistent storage device. Subsequently, the data may be written. Periodically, self-optimization may occur to improve read speeds or other metrics.

Hardware

Figure 1:
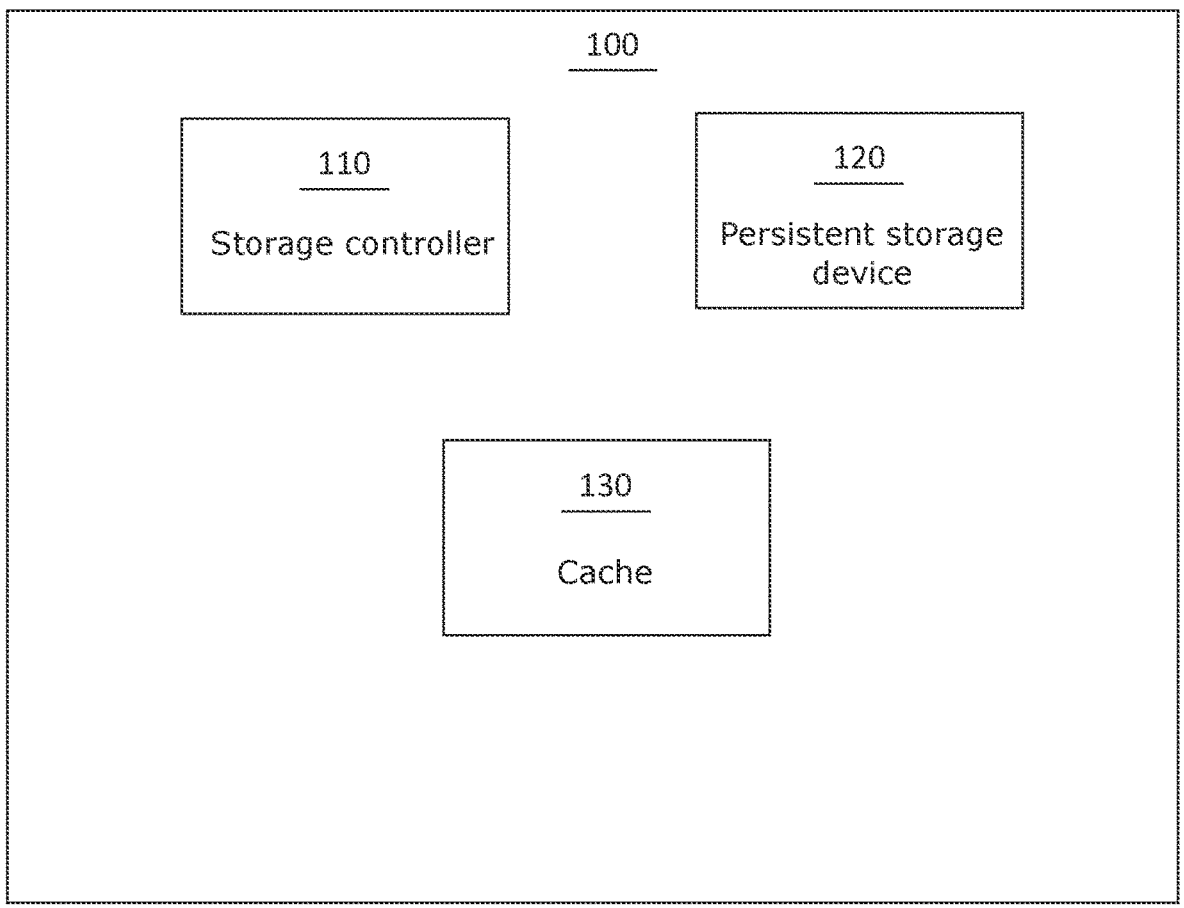
FIG. 1 shows an example storage system.

FIG. 1 shows an example storage system 100 comprising a storage controller 110, a persistent storage device 120, and a cache 130.

The storage controller 110 is in communication with a persistent storage device 120. The persistent storage device 120 is a system for storing data in a persistent manner. Although the persistent storage device is shown as a single component, in practice it generally comprises multiple drives, such as hard disk drives, zoned hard drives (shingled magnetic recording drives), or solid-state drives arranged into groups and may be distributed over a number of storage nodes (for example, in a network). Data is stored across all the drives or a subset of the drives in a protected stripe and may have error correcting encoding applied to reduce the risk of data loss if a component of the persistent storage device 120 fails.

Persistent storage device 120 can comprise multiple nodes configured for different functions. For example, there may be one node configured for receiving write requests, while a different node comprises the physical storage space. These nodes may be interconnected and may also be connected to other nodes in a mesh network.

The persistent storage device may be partitioned based on performance (for example, read speed). Partitioning may be performed within a drive or in relation to multiple drives. In one example, a hard disk drive may be partitioned into multiple partitions. Specifically, a partition may be one or more tracks in a hard disk drive, one or more zones in a zoned drive, or one or more dies in a solid-state drive. In another example, the persistent storage device may be partitioned according to the different types of drives: one partition may comprise solid state drives while another partition may comprise hard disk drives. To avoid doubt, these examples are not mutually exclusive.

The partitioning may be based on a weighted function of characteristic values including but not limited to speed and resiliency. Using speed as an example, a fast or slow partition is a partition that is deemed fast or slow at a given time. Outer tracks of a hard disk drive are faster than the inner tracks, and solid-state drives are faster than hard disk drives, so the former in each case are likely to be fast partitions. However, it is not the case that a partition is statically labelled as fast, slow, or having a particular speed since the speed of a partition may dynamically vary depending on the state of the storage system. For example, a slow partition may be a Zone A currently being written to in a zoned drive, and a fast partition may be an idle Zone B in the same zoned drive, despite Zone A being a faster zone than Zone B when both are idle.

The size and number of partitions is not restricted. In an extreme case, each partition may be a single data block (described in more detail below).

The drives in persistent storage device 120 can be single or dual ported drives. A dual ported drive can selectively (for example, via a switch) connect to two nodes in a mesh network. Some drives may be configured to connect to any number of nodes.

Certain drives might be faster or slower depending on their connections to the storage controller 110. For example, a first drive connected via a first connection involving multiple switches may be slower than a second drive connected via a second connection involving fewer switches.

Data is stored on the persistent storage devices 120 in blocks. A block is a unit of data of predetermined size, such as 512 bytes, 4 KiB (4096 bytes), or 4160 bytes (4096 for data and 64 for metadata). The storage controller 110 is configured to use logical block addressing (LBA) when receiving requests to interact with the persistent storage device 120. LBA provides that each block of data stored on the persistent storage device 120 is identified by a unique integer LBA value. The storage controller 110 may translate an LBA value to determine which physical location on which drive the data is actually stored on. This translation relies on a mapping between a virtual location and a physical location (described in more detail below). This translation can allow the storage controller 110 to administer the underlying storage architecture of the persistent storage device 120 without external programs being required to record the physical location of the data.

The storage controller 110 is further in communication with a cache 130. The cache comprises non-volatile memory chips configured to operate as a non-volatile cache. This may involve the use of flash memory alone or in combination with conventional volatile memory. The non-volatile memory chips may be configured as non-volatile dual in-line memory modules (NVDIMM) In some cases, volatile memory may be configured as a non-volatile cache.

While the storage controller is described as a single component, in practice the different functions of the storage controller may be split across different entities. For example, interactions with the cache 130 may occur through a cache controller independent of the storage controller 110.

Each storage controller 110 may be associated with a corresponding NUMA (Non-Uniform Memory Access) node. NUMA is a multiprocessing computing architecture where at least memory access time depends on the memory location relative to each processor In some implementations memory access time depends on the memory location relative to particular cores of a processor Further access time to particular I/O controllers and the peripherals connected to the I/O controllers can be relative to a particular processor or particular cores of a processor. A NUMA node may be a single CPU (central processing unit), a group of CPUs, a CPU core, a group of CPU cores.

In another example, each storage controller 110 may not be associated with a corresponding NUMA node. Instead, each storage controller 110 may use an alternative approach.

Writing Data

Figure 2:
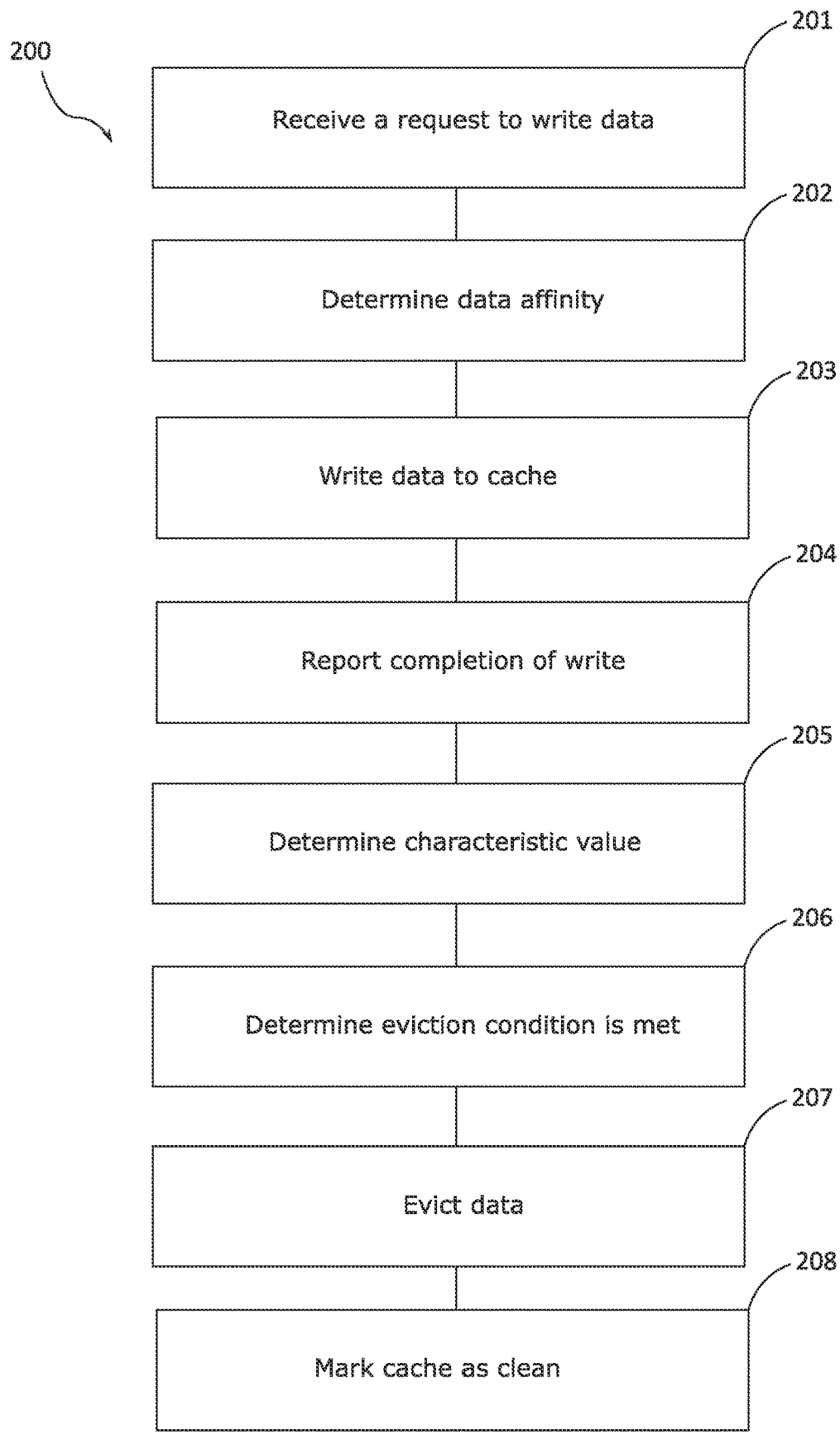
FIG. 2 shows an example approach for writing data.

The storage controller is configured to administer writing data to the persistent storage device. FIG. 2 shows an example method 200 through which the storage controller can write data.

At step 201, the storage controller receives a stream of blocks. The stream of blocks comprises data. The stream of blocks may be received into a placement intelligence.

In one embodiment, the stream of blocks may be received as part of a request to store data. The request comprises an indication of the data to be stored and an LBA value to indicate where the data should be stored. The request may be in the form of a write instruction from a program running on a processor.

In one example, the placement intelligence may be implemented as a cache. As the data is received into the cache, the storage controller may group the data with a view to optimizing the later movement of data from the cache to storage. The effectiveness of this optimization may be limited by the finite size of the cache. Data needs to be evicted from the cache to storage to avoid the cache being filled up. In another example, the cache size may be practically unlimited, for example if the cache is located in storage as opposed to memory.

In some cases, after the storage controller writes the data to the cache (which may be distributed across multiple devices), the storage controller may report the data as having been written to a persistent storage device. This occurs even though the data has not actually been written to a persistent storage device, but only remains in the cache. This provides a benefit of highly responsive write response without the delay that may otherwise occur when writing to a persistent storage device.

At step 202, the storage controller determines a treatment of the data. The treatment of the data determines how the storage controller acts on the data. For example, this may comprise how the storage controller stores or retains the data in the placement intelligence. This may be based on an affinity.

The treatment need not be based on a single block. Instead, the treatment determination may be based on a stream of blocks being received.

The affinity may be based, at least in part, on content analysis. To this end, the storage controller may analyze the content of the data. This may indicate one or more of that the data is encrypted, that the data is alpha-numeric, that the data is numeric, and/or that the data is a bitstream.

The affinity may be based, at least in part, on positional analysis. To this end, the storage controller may analyze the position at which the data is expected to be written to storage from the placement intelligence. This may comprise one or more of:
  the LBA value;
  whether an LBA value is written to for the first time or overwritten;
  the frequency at which an LBA value is updated and/or written to, and
  an expectation that pieces of data at a sequence of LBA values are to be updated and/or deleted together.

The affinity may be based, at least in part, on computational analysis. The storage controller may execute one or more functions on the data to influence the affinity. For example, the storage controller may analyze the manner in which the storage controller received the stream of blocks. This may comprise one or more of:
  a process identifier of the process which issued the request to write data,
  a processor identifier of the processor executing the process which issued the request to write data; and
  a processor core identifier of the core of the processor executing the process which issued the request to write data.

The affinity may be based, at least in part, on temporal analysis. To this end, the storage controller may analyze when the data was received. This may include the time of day, frequency of receipt, or any other temporal factors.

The affinity may be based, at least in part, on resource constraints. For example, there may be constraints on the duration of how long data may be retained in the placement intelligence. For example, a policy may require that data is written from the placement intelligence within a predetermined amount of time (such as within 4 seconds). However, it may be preferable to allow data to stay in the placement intelligence for a sufficient period to allow for other factors in the treatment to be properly analyzed. For example content analysis or temporal analysis may require that data stays in the placement intelligence for a reasonable period of time.

The affinity may be based, at least in part, on behavioral analysis. To this end, the storage controller may analyze the manner in which the data is used or is likely to be used. This may comprise one or more of:
  the likelihood or frequency of the data being read; and
  the likelihood or frequency of the data being overwritten.

The affinity may be based, at least in part, on hardware analysis. For example, different storage devices may have different known characteristics. This may affect the treatment of the data.

These factors may be derived over time. For example, the storage controller may analyze different streams to determine overarching characteristics. This may assist in content analysis, positional analysis, computational analysis, or other analysis, to determine the affinity. In addition, further factors may be derived based on the rate of change over time, such as the rate at which the expected life of a device changes.

The storage controller may weight one or more of these factors to determine the affinity. The weights given to each factor may vary over time. For example, the weights may be dynamically adjusted to achieve predetermined performance outcomes.

Figure 3:
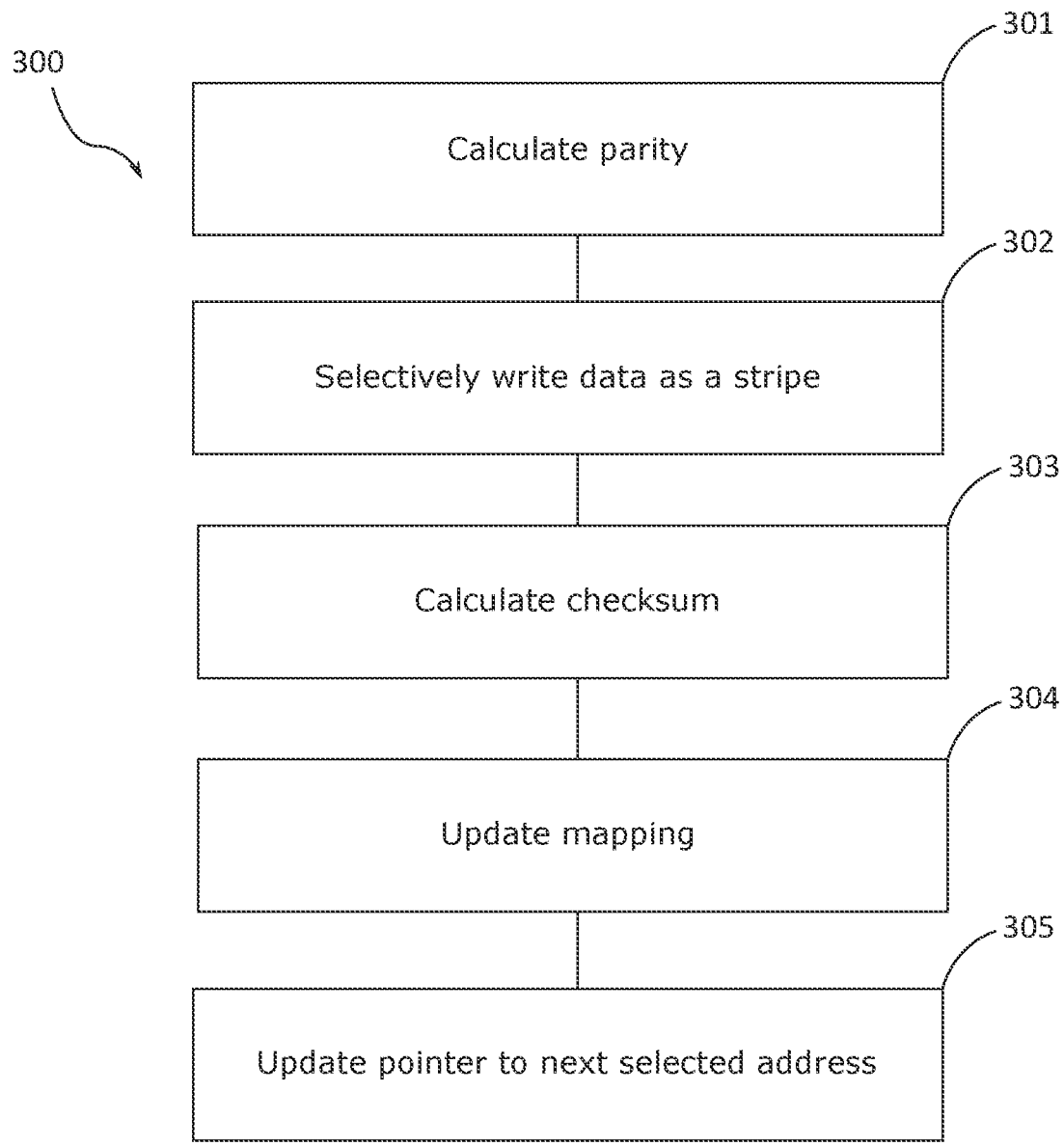
FIG. 3 shows a first example approach for evicting data from a cache.

At step 203, the data is written from the placement intelligence to a persistent storage device. The data selected from the placement intelligence for writing is based on the determined affinity. Specific approaches for writing the data are described further in relation to FIG. 3.

In some cases, the manner in which the data is written to a persistent storage device may vary.

In a first embodiment, the persistent storage device comprises one or more storage devices (such as solid-state drives), and the data may be placed in specific places inside one or more of the storage devices.

In a second embodiment, the persistent storage device comprises one or more storage devices (such as solid-state drives), and the data is stored across multiple devices and/or across multiple zones. This may optimize for speed, for example.

In a third embodiment, the persistent storage device comprises one or more storage devices (such as solid-state drives), and the data is stored across multiple devices. This may optimize for longevity, for example. In particular, the data may be stored on devices of a particular class. For example, TLC storage devices may be preferred for data that is frequently overwritten and QLC storage devices may be preferred for data that is less frequently overwritten, to reflect the different characteristics of such devices.

In a fourth embodiment, the persistent storage device may comprise multiple systems, with the data being distributed across the systems.

In a fifth embodiment, the persistent storage device comprises multiple arrays, where the different arrays offer different characteristics. In some cases, one or more of the arrays may be cloud storage located outside of the storage system.

In some cases, the storage controller may determine a characteristic value for the data to be written to the persistent storage device. In the context of speed, data with a high characteristic value may desirably be read fast. For example, such data may be data that is read frequently and/or data that must be read in a timely manner. Such a characteristic value may therefore influence how the data is stored, such as the class of the storage device or whether the storage device is a zoned storage device.

More than one characteristic value may be determined. A second example characteristic value may be related to resiliency.

The characteristic value may be indicated as part of the access request. Alternatively or additionally, the storage controller may determine the characteristic value based on historical data. As an example, if some new data to be written to the persistent storage device has affinity with data that is known to have a high characteristic value (as indicated by the historical data), then the storage controller may determine that this new data also has a high characteristic value. The characteristic value is a type of metadata.

Selective Writing with Redirection

The storage controller may preferably cause data to be selectively written to the persistent storage device based on a list of free physical locations. Writing to the persistent storage device may require writing the stream to the persistent storage device in a location different from the LBA values of the blocks in the stream. Consequently, once written, the storage controller may update a mapping between the LBA values of each block and the physical address of the persistent storage device. This allows the data to be addressed using an LBA value independent of the physical address at which data is actually stored. This technique of writing using a mapping between LBA values and physical addresses may be called redirection.

The storage controller maintains a list of free physical locations in the persistent storage device. The list may comprise multiple sub-lists, with each sub-list corresponding to a drive in the persistent storage device. Data is always written from cache to a location in the list. By always storing data to a selected address in the list, this can be used to avoid a disk going through a read-modify-write cycle. The address may be purposefully selected to optimize performance. This may improve throughput and write speed for hard disk drives and solid-state drives. For solid state drives specifically, this may improve longevity.

This method may be implemented via a driver. The driver may provide a functionality to write data, read data, and update data. In this way, the driver provides all the necessary functionality for a block device, such as a persistent storage device. In particular, the driver may be a userspace application which receives system calls from a kernel module and in turn writes data to the underlying persistent storage device.

Method 300 describes a method of selectively writing to an array of drives in the persistent storage device with redirection. A stripe comprising data blocks may be written across the whole array of drives or a subset of the drives. The length of a stripe (how many drives the stripe spans) may be a fixed number or may be dynamically variable In this way, a subset of the drives in the array can be used for data and the remaining drives can be used for parity for a given stripe.

During configuration, the system may be configured to have a particular resilience. Each stripe comprises in blocks, one of which is on a different drive. As mentioned above, n need not be the number of drives in the array, that is, a stripe need not span the whole array. Further, the value of n may change from write to write. Within each stripe, k of the blocks include data and m of the block are parity, such that $n=k+m$. Consequently, the data can be recovered if any k of the blocks within a stripe is available (whether the blocks are data or parity). This may be described as k+m parity. One common arrangement is 8+2 parity, where within a stripe there are 8 blocks of data and 2 blocks of parity, however any value for k and m may be used. One approach for generating the parity data in such a scheme is to use erasure encoding.

It can be useful for subsequent stripes to use different drives for parity. One way to administer this is to nominate a starting drive for each stripe: stripe 0 starts at drive 0, stripe 1 starts at drive 1, and so on. This will naturally cause the parity blocks (which are written after the data blocks) to be on different drives. However, another method of distributing parity blocks may be used.

A request has been received (for example, at step 201) to write data to a first location of the persistent storage device. The request may be sent from the storage controller. The request may be received by a function call of the driver. The request may comprise the data or may comprise a pointer to where the data may be retrieved from (for example, a memory address).

The first location is a virtual location (as indicated by an LBA) since it may not correspond to a physical location on a persistent device. However, the first location is structured as if it were a physical location since the redirection by the driver is hidden from a user of the driver. The request may therefore comprise an identifier of the first location. A subsequent request to read the data from the virtual location should therefore return the same data irrespective of the physical location of the data.

Optionally at step 301, after k data blocks have been received, the driver calculates parity data based on written data. This results in n blocks of parity data. In an example where k is fixed, dummy data (for example, zeroes) may be written to meet the length requirement. This avoids having to wait for k data blocks in situations where data should be immediately written to the persistent storage device.

At step 302, the k data blocks (and optionally the m blocks of parity data) are selectively written as a stripe to a second location based on metadata. The second location is a physical location which corresponds to a stripe in the array of drives. The second location may therefore be a physical location index. In a different sense, the second location is a collection of physical addresses, the collection being a physical address per drive in a stripe. The virtual location may not be correlated with the physical location.

Unless specified otherwise, "data" in the steps described below refers to the received data to be written to storage and optionally parity data generated from the received data.

In particular, the physical location is a selected address in a list of free physical locations in the persistent storage device. The list may comprise multiple sub-lists, with each sub-list corresponding to a drive in the persistent storage device. A free physical location is a location at which no data is stored, or if data is stored, there is no need for that data to be retrievable (data is marked clean).

In one example, the list is a queue structure, a head of the queue points to an end of the queue from which physical addresses in the queue get popped. After a free physical location pointed to by the head has been written to, that address is pushed out of the queue, and the other addresses advance towards the head of the queue In this way, physical locations in the queue can be ordered for the purpose of optimizing performance.

Diagrammatically, the selected address is represented by an arrow for ease of illustration, though in practice the selected address may simply be maintained as a pointer.

By writing to a selected address in the list of free physical locations (which, by definition, is free), there is no need to determine whether the data at the indicated block has changed. This avoids the need to initially read from the block, and therefore can result in improved performance.

Moreover, because the physical location need not be correlated with the virtual location, there is no need for the requestor (such as a program) to determine where the next free block is to achieve this. The function of a location as a label to retrieve data is decoupled from the function of a location as a mechanism for managing a persistent storage device. These functions are performed by the virtual location and the physical location respectively.

The storage controller may achieve selectivity in writing based on the characteristic value of the data determined in the method of FIG. 2. Given a characteristic value, the storage controller selectively writes to a physical location that is well-suited to that characteristic value.

In the case that the characteristic value relates to speed, the storage controller may selectively write data to either a slow partition or a fast partition based on the characteristic value of the data. If the data has a low characteristic value, the storage controller may write it to a slow partition. Conversely if the data has a high characteristic value, the storage controller may write it to a fast partition.

In the case that the characteristic value relates to resiliency, the storage controller may selectively write data to either one or more reliable partitions or one or more partitions more prone to failure based on the characteristic value of the data. If the data has a low characteristic value, the storage controller may write it to a partition more prone to failure. Conversely if the data has a high characteristic value, the storage controller may write it to a more reliable partition.

The storage controller may selectively write data based on a weighted function of multiple characteristic values.

As a further example, selectivity may be achieved by distributing data with affinity across multiple dies on multiple solid-state drives. This may reduce a worst-case recovery time in the event of a die failure.

As a further example, selectivity may be achieved by writing blocks with affinity to a contiguous region in the persistent storage device. For an array of hard disk drives, contiguously writing data with affinity may reduce seek time and improve read performance, since data with affinity are likely to be read together.

As a further example, selectivity may be achieved by distributing data with affinity across multiple zones in zoned drives. This will allow the data with affinity to be read in parallel, thereby improving expected read performance. A further benefit is that distributing data across multiple zones means writing data in parallel, which is generally faster than writing the same amount of data to the same zone.

At step 303, a checksum for the data at the block indicated by the physical location may be calculated or alternatively provided with the data (for example, as part of the write request of step 201). The checksum may be a cryptographic hash. This can be used to verify that data subsequently retrieved from the block is the same as the data stored at the block. In some cases, the checksum may comprise parity information which can correct some errors in the block.

At step 304, a mapping for the persistent storage device is updated. The mapping is updated after writing data to the physical location. The mapping links the virtual location (which the requestor or another process can use to indicate the intended data to be retrieved) to the physical location (where the actual data is stored).

The mapping may be stored on the persistent storage device. For example, this may be a predetermined part of the persistent storage device. Additionally, or alternatively, the mapping is stored on a separate persistent storage device.

In some cases, updating a mapping for the block comprises determining if mapping for the block indicated by the first location already exists. If it exists, the original mapping may be updated, and replacement mapping inserted (or the new mapping overwritten on the original mapping). This can prevent the mapping having multiple entries for the same data. The physical location corresponding to the previous location may be marked as dirty, indicating that it is free to be written over.

At step 305, a pointer is updated to reflect the next selected address in the list of free physical locations. If the list is a queue structure, the pointer is the head of the queue. After a free physical location pointed to by the head has been written to, that address is pushed out of the queue, and the other addresses advance towards the head of the queue. In this way, the head is updated because it is now pointing at a different physical address.

Determining the next selected address may be based on an estimate of the affinity or characteristic value of the data to be written next. This step of updating the pointer can therefore allow data to be selectively written to the persistent storage device in the next write operation.

This approach of selectively writing data with redirection provides a high-performance approach to writing data to the persistent storage device, since the read-modify-write cycle of some conventional write approaches may be avoided. This can lead to better throughput.

A further benefit is that the lifespan of drives may be prolonged using the current approach. In conventional approaches, when a single block fails or reaches its maximum number of writes, the whole drive is often replaced. For example, in the case of a hard disk drive, a single hot spot (corresponding to one physical address) can cause the drive to reach the end of its life even if the bulk of the drive has never been written to. However, in the current approach, the selected address can be updated at step 305 to cause equal levels of writing across the drive. That is, each block will generally be written to once before any block is written to a second time, irrespective of the virtual address of the data being written. This approach therefore may avoid premature wearing of drives.

Further, this writing approach supports operation of solid-state drives in the persistent storage device after failure. With the writing approach described above, the specific address or addresses at which the failure occurred may be localized and subsequently trimmed from the list of free physical locations. Other locations in the drive remain in the list and are still available to be written to.

Reading

Figure 4:
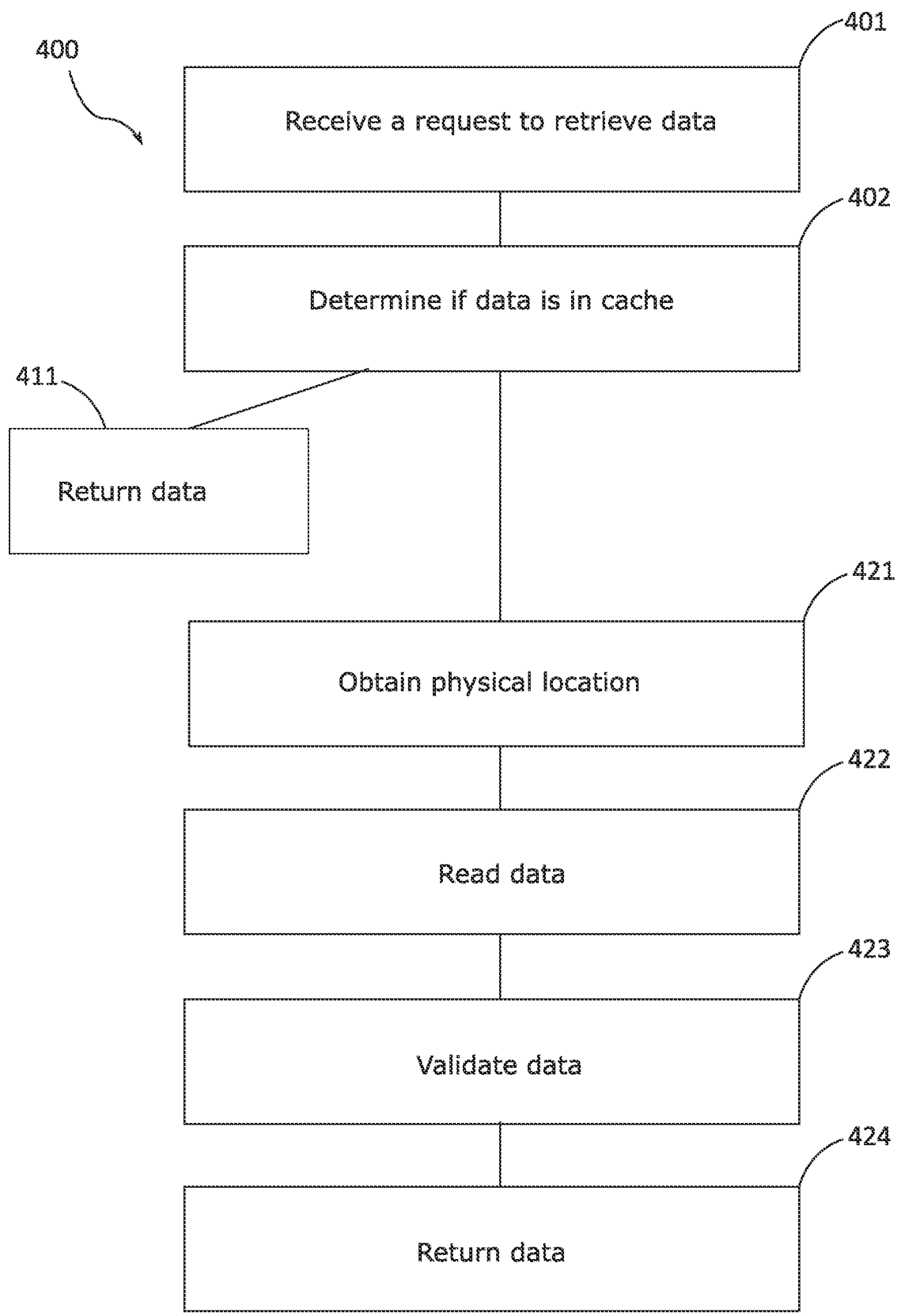
FIG. 4 shows an example approach for reading data.

The storage controller is also configured to administer reading data from the persistent storage device. FIG. 4 shows an example approach through which the storage controller can read data.

At step 401, the storage controller receives a request to retrieve data stored on the persistent storage device. For example, this may be received by a function call of the driver. The request may comprise a pointer to where the data should be stored once retrieved (for example, a memory address).

The request comprises an LBA value to indicate where the data should be read from. The request may be in the form of a read instruction from a program running on a processor, which indicates that the data should be written to a particular memory address.

At step 402, the storage controller determines if the data is in the cache.

This occurs by the storage controller checking the mapping between LBAs and cache. If the LBA in the request is in the mapping, then the method proceeds to step 411. If the LBA in the request is not in the mapping, then the method proceeds to step 421.

At step 411, the storage controller returns the data in the cache.

This may occur by copying the data from the cache to the memory address. The storage controller may then send an indication, such as an interrupt, to the program indicating the read is complete.

At step 421, a physical location for the data corresponding to the first location is obtained from the metadata. This may be obtained by finding the virtual location in the mapping of the metadata and finding the corresponding physical location. If the metadata does not contain references to the virtual location, the read request may fail, and an error may be raised.

At step 422, the storage controller reads the data from the persistent storage device into cache. This may occur by obtaining the data from the physical location and writing the data to the memory address. The storage controller may then send an indication, such as an interrupt, to the program indicating the read is complete. The data may then be stored in a memory location indicated in the request or another location.

At step 423, the retrieved data may be validated to ensure that the retrieved data is the data which was originally stored. This may involve calculating a checksum for the retrieved data and comparing it to the checksum stored with the data. If the checksums match, it is highly likely the data was successfully retrieved.

If the checksums do not match, but the data can be recovered, this may be performed. This may make use of parity information stored in the same stripe as the data. After recovery, the recovered data is moved into cache. If the errors cannot be corrected, a notification, warning, or error may be raised.

In some cases, step 423 may be omitted. For example, on reads where it is desirable to maximize throughput, step 423 may be selectively skipped.

At step 424, the retrieved (and optionally validated) data can then be returned to the process which issued the read request. This may comprise providing a success value (such as 1) as a return value to a function call In the event of missing (corrupt) mapping or irrecoverable data, a 0 value may be returned to the function call.

In some cases, the read may be logged. With enough entries, the log can provide historical data for estimating an expected read pattern.

From the point of view of the other requestor, the data was stored at, and retrieved from, the virtual location. The management and configuration of the persistent storage device is therefore obscured from the process which attempts to read the data.

Self-Optimization

The system may autonomously perform processes to improve performance. This may be called self-optimization. One of the performances that can be improved is the read performance. An example method of self-optimization involves relocating data in the persistent storage device. For a persistent storage device comprising multiple drives, this may necessitate moving data from one drive to another.

Figure 5:
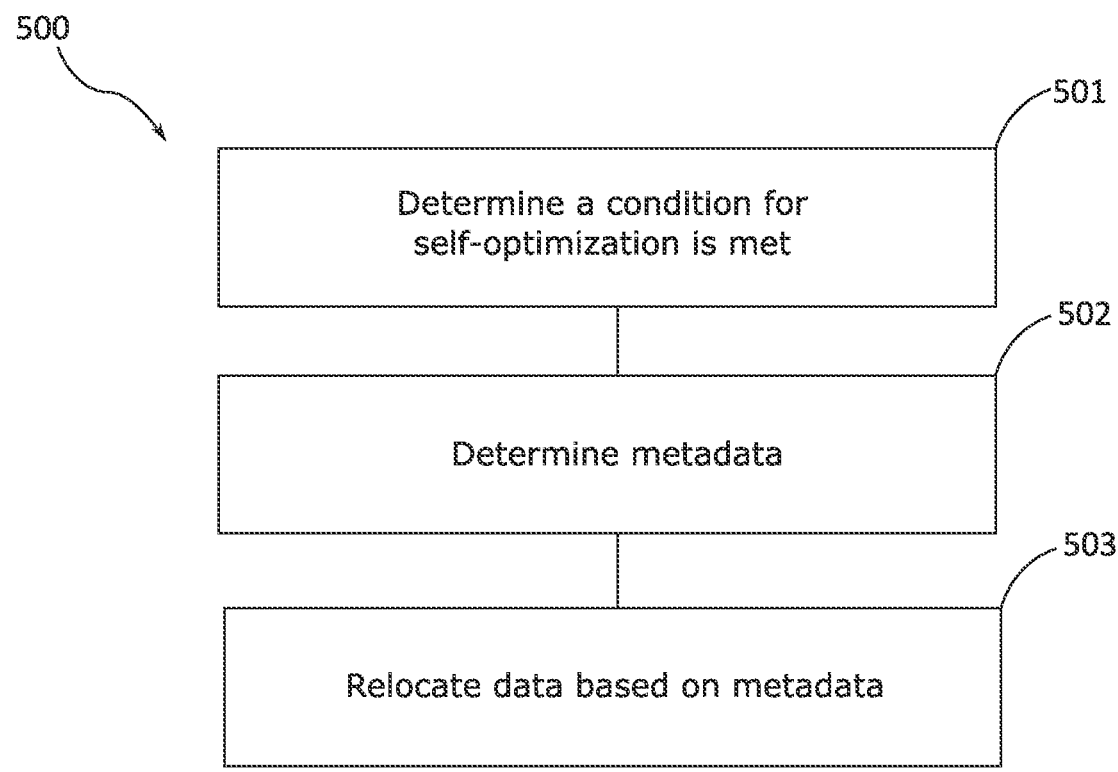
FIG. 5 shows an example approach for relocating data.

An example method 500 of data relocation for self-optimization is shown in FIG. 5.

At step 501, the storage controller determines that an appropriate condition for initiating self-optimization is met. A first condition may be based on a number of gaps on the persistent storage device exceeding a predetermined threshold. An efficiency metric may be calculated based on the number of gaps. There is a negative correlation between efficiency and the number of gaps. For a large number of gaps, it is unlikely that data blocks which match an expected read pattern will be located in a contiguous region, which means there could be significant seek time for hard disk drives. Thus, the storage controller may determine that a low efficiency score (reflecting a large number of gaps) necessitates garbage collection. Further, the storage controller may prioritize performing garbage collection on a stripe with more gaps; this information may be provided by a gap counter that is incremented each time a metadata entry for a block in the stripe is deleted.

A second condition may be that an activity level of the persistent storage device falls below a threshold. If the storage system is under heavy load, the storage controller may determine that it is not an appropriate time for self-optimization since time-sensitive tasks such as read and write take priority. A timer may be used to determine the second condition has been met. For example, if the activity level has been under the threshold for a predetermined period, a self-optimization process may commence.

A third condition may be that a free capacity of the persistent storage device falls below a threshold. For example, when a head gets near its corresponding tail, it may be useful to preemptively recover some usable space. In this case, the self-optimization process will be a garbage collection process involving selective data placements.

A fourth condition may be that a certain time period has passed. That is, it may be useful for self-optimization to occur periodically.

A fifth condition may be that self-optimization is scheduled to trigger at a predetermined time.

At step 502, the storage controller determines metadata about data stored in the persistent storage device for the purpose of self-optimization. This metadata may comprise an expected read pattern, which may be estimated based on one or more metrics that are periodically obtained (updated) during operation of the persistent storage device. There may be plugins, bots, or daemons which periodically update these metrics. One of the metrics is data affinity. As explained above, grouping based on affinity may be performed in cache but is limited by the cache's finite size. Similarly, an expected read pattern may be estimated for data existing in the persistent storage controller based on affinity. Affinity may be determined in a similar approach to that of step 202 of method 200. Additionally, or alternatively, an expected read pattern may be estimated based on historical data (a second metric). That is, if certain data blocks have been repeatedly read together in the past, then that might be a strong indication that these data blocks form a read pattern. The expected read pattern may be used to improve performance including but not limited to read speed and a worst-case recovery time.

The metadata of step 502 may further comprise a characteristic value for data existing in the persistent storage device. This characteristic value may be an updated version of the characteristic value calculated in the process of FIG. 2. The characteristic value may be updated based on historical data. For example, if some data has been read at a higher frequency than had been initially anticipated, then that data may be reassigned to a higher characteristic value. Conversely, if some data has been read at a lower frequency than had been initially anticipated, then that data may be reassigned to a lower characteristic value. Without a predetermined characteristic value, a characteristic value may be determined based on historical data and/or an indication as part of a data access request.

At step 503, the storage controller relocates data from a first physical location in the persistent storage device to a second, different physical location in the persistent storage device. This relocation is performed based on the metadata of step 502.

Figure 6:
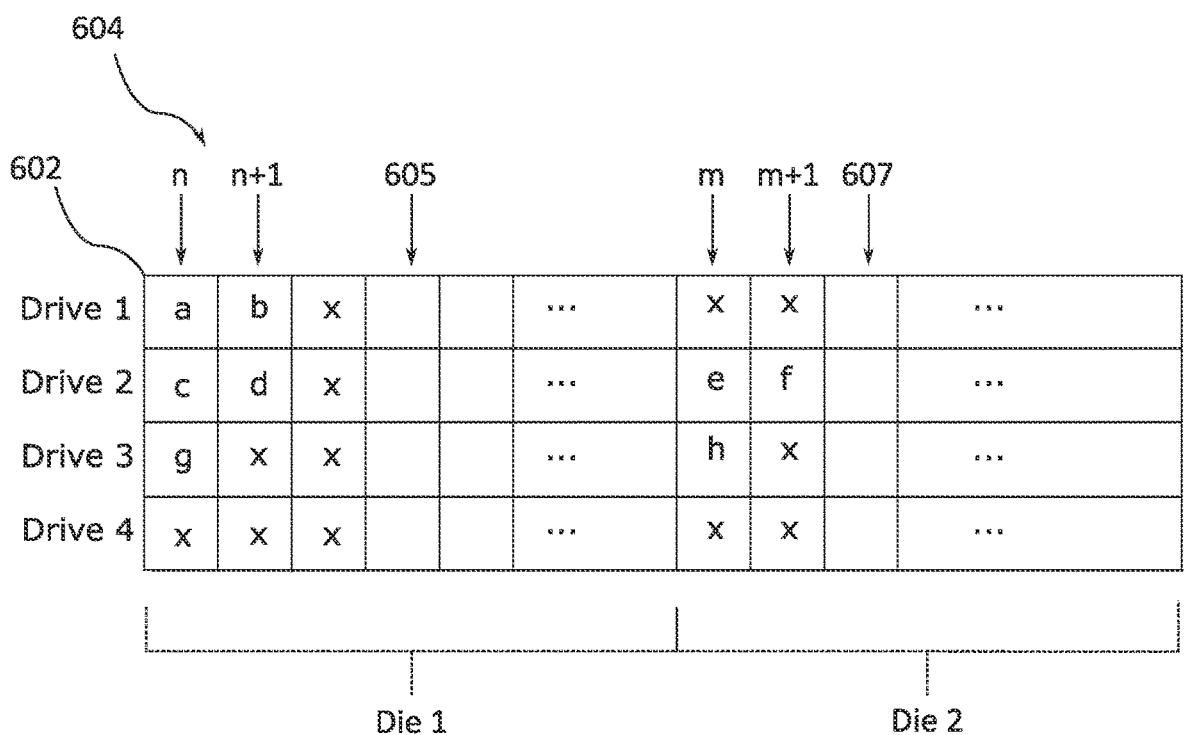
FIG. 6 shows a first example of data relocation for self-optimization.
Figure 6:
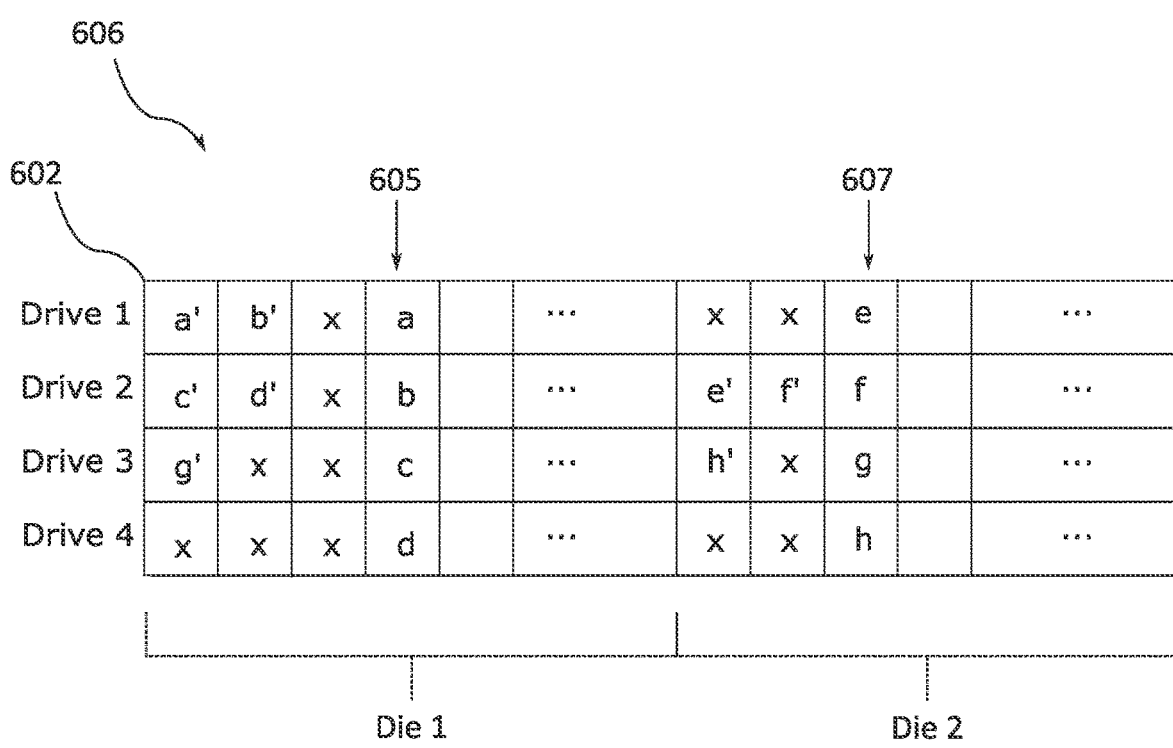

FIG. 6 illustrates a first example of data relocation in self-optimization. This relates to distributing data across multiple dies in an array of solid-state drives, as previously described in relation to step 302.

For simplicity, array 602 of solid-state drives is shown to comprise only four drives: Drive 1, Drive 2, Drive 3, and Drive 4, with each drive comprising only two dies. However, a solid disk drive array is likely to comprise more drives in practice, and a solid disk drive is likely to comprise more dies. The concept described below can be applied to a solid disk array comprising more drives, with each drive comprising more dies.

State 604 shows array 602 prior to self-optimization. The storage controller determines that data blocks a, b, c, d, e, f, g, and h (related data blocks) match a read pattern determined at step 502. Other data blocks are denoted by "x", which may include parity data for reconstruction.

In the event of a Die 1 failure on Drive 1, data blocks a and b would need to be reconstructed based on the other blocks of other drives at in and n+1. This would require two reconstruction operations. In the event that Drive 2 failed, data blocks c, d, e, and f would need to be reconstructed based on the other blocks of other drives at n, n+1, m, and m+1. This would require four reconstruction operations.

By distributing the related data blocks across Die 1 and Die 2, the expected reconstruction time may be reduced. This is achieved by first reading the related data blocks from array 602 into memory and then rewriting them to array 602 at a different physical location according to steps 301 to 305. Unlike in the case of hard disk drives, not contiguously writing the related data blocks will not cause an increase in seek time. However, it is preferable that the related data blocks are distributed.

Distributing data across dies can be achieved by purposefully selecting addresses from the list of free physical locations In the example of FIG. 6 which has two dies, a first selected address is 605 on Die 1, and a second selected address is 607 on Die 2.

State 606 shows array 602 after self-optimization. It can be seen that the related data blocks are distributed across the drives in the array and distributed across the dies in a drive. This will reduce the worst-case recovery time due to the related data blocks not being concentrated on a particular die or a particular drive. In the event of a Die 1 failure on Drive 1, only data block a would need to be reconstructed. That is, only a single reconstruction operation is required, whereas two reconstruction operations would be required for state 604 as described above In the event that Drive 2 failed, only data blocks b and f would need to be reconstructed. That is, only two reconstruction operations are required, whereas four reconstruction operations would be required for state 604 as described above.

The related data blocks in state 602 are marked clean so as to indicate that the physical location can be reused. This is denoted in the figures by an apostrophe, for example, a' is a marked clean.

Reducing the worst-case recovery time may in turn improve the worst case read performance since data reconstruction may occur as part of the reading process. It should be noted that there may not be an improvement in speed on average. For state 604, as an example, no reconstruction operations will be required to reconstruct any of the related data blocks should Drive 4 fail, whereas two reconstruction operations will be required for state 606. The improvement is in relation to a worst-case scenario. In other words, distributing the data blocks can reduce the variance in recovery time such that the worst-case recovery time approximates the average recovery time.

FIG. 6 merely illustrates one example that aims for an even distribution of data. With more information about the persistent storage device, the distribution of related data blocks may be adjusted accordingly. The information may comprise an expected failure rate for certain physical locations. If it is known that certain physical locations are prone to failure, then the storage controller may avoid relocation data to those locations. The information may also comprise a metric of how reliable certain physical locations are. If it is known that certain physical locations are more reliable, then the storage controller may prioritize relocating data to those physical locations In other words, the worst-case recovery time is not optimized merely by evenly distributing data.

Figure 7:
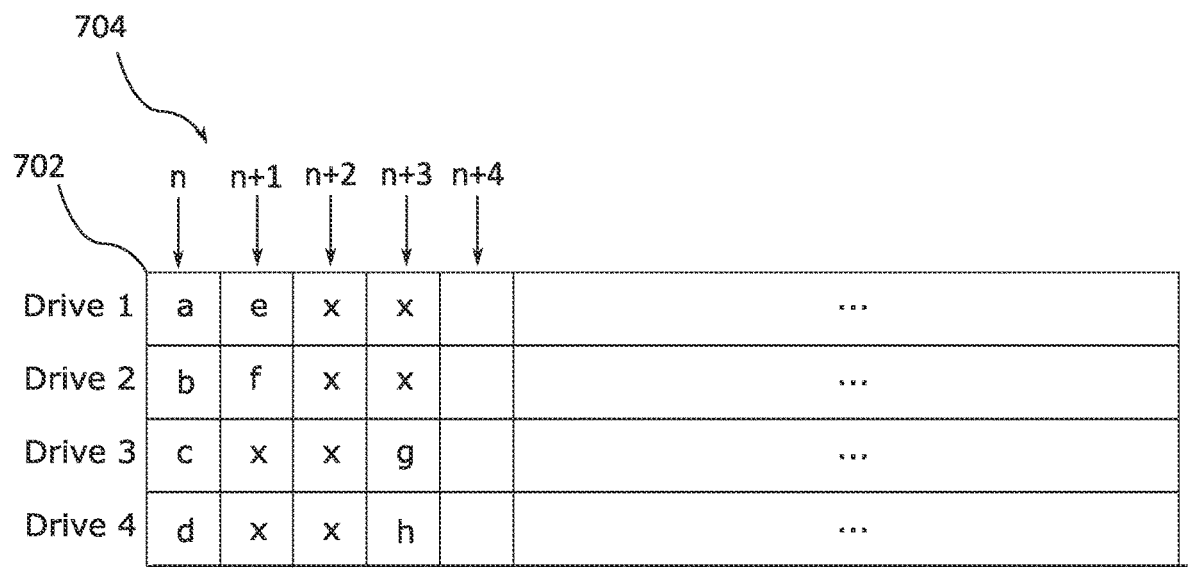
FIG. 7 shows a second example of data relocation for self-optimization.
Figure 7:
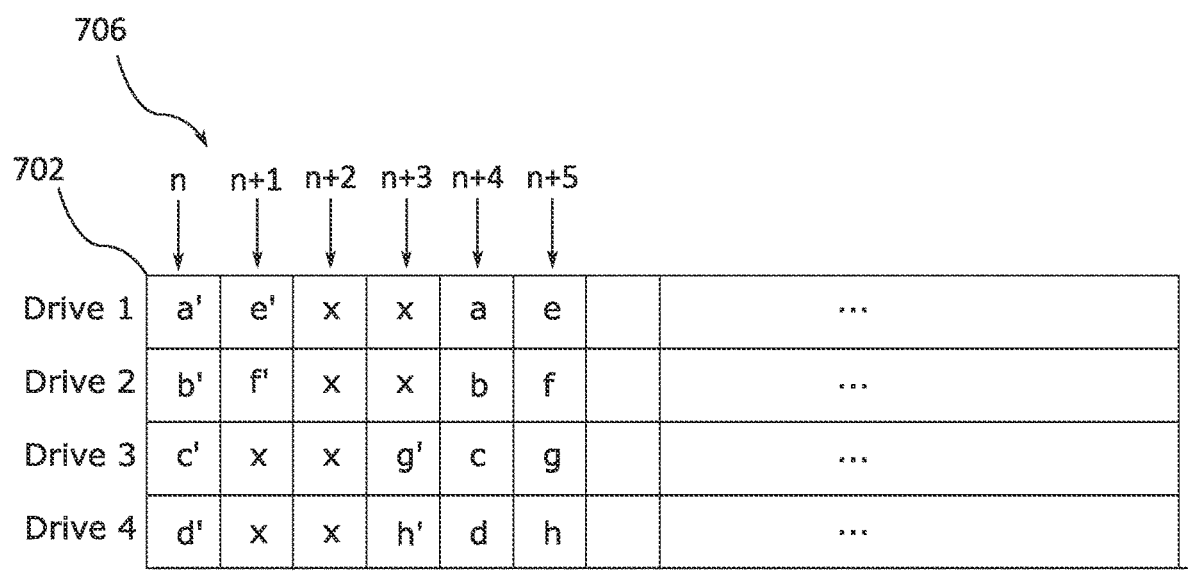

FIG. 7 illustrates a second example of data relocation in self-optimization. This relates to the contiguous writing of step 302 for reducing seek time in an array of hard disk drives.

For simplicity, array 702 of hard disk drives is shown to comprise only four drives. Drive 1, Drive 2, Drive 3, and Drive 4 However, a hard disk drive array in the persistent storage device is likely to comprise more hard disk drives in practice.

State 704 shows array 702 prior to self-optimization. The storage controller determines that data blocks a, b, c, d, e, f, g, and h (related data blocks) match a read pattern determined at step 502. It can be seen that the related data blocks do not occupy a contiguous region on array 702. Other data blocks (denoted by "x") exist in the stripes at indices n+1, n+2, and n+3. There is therefore an expected read delay due to seek time. The collection of addresses selected from the list of free physical locations is at n+4.

The related data blocks are read into memory. After the related data blocks have been sorted and grouped, they are rewritten to a different physical location in array 702 according to steps 301 to 305. In this particular case, there are eight related data blocks, and so two stripes need to be rewritten to the persistent storage device. The first stripe comprising data blocks a, b, c, and d are written to n+4. Pointers are updated to point to the next collection of addresses selected from the list of free physical locations at n+5. The pointers are updated since the goal of the optimization here is to store the related data blocks in a contiguous region. The second stripe comprising data blocks e, f, g, and h are then written to n+5.

State 706 shows array 702 after self-optimization. The related data blocks occupy a contiguous region covering two adjacent stripes at n+4 and n+5. The expected read delay due to seek time is minimized, which consequently optimizes expected read performance. The related data blocks at n, n+1, n+2, and n+3 are marked clean so as to indicate that the physical locations can be reused.

Figure 8:
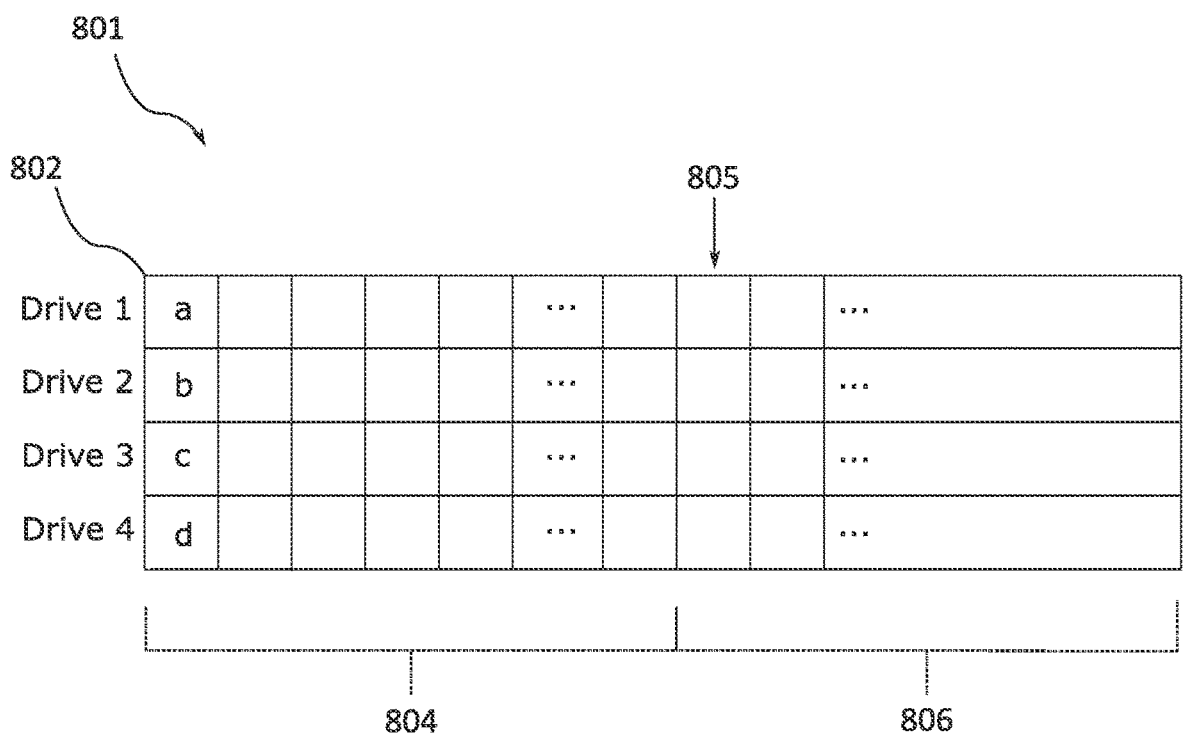
FIG. 8 shows a third example of data relocation for self-optimization.
Figure 8:
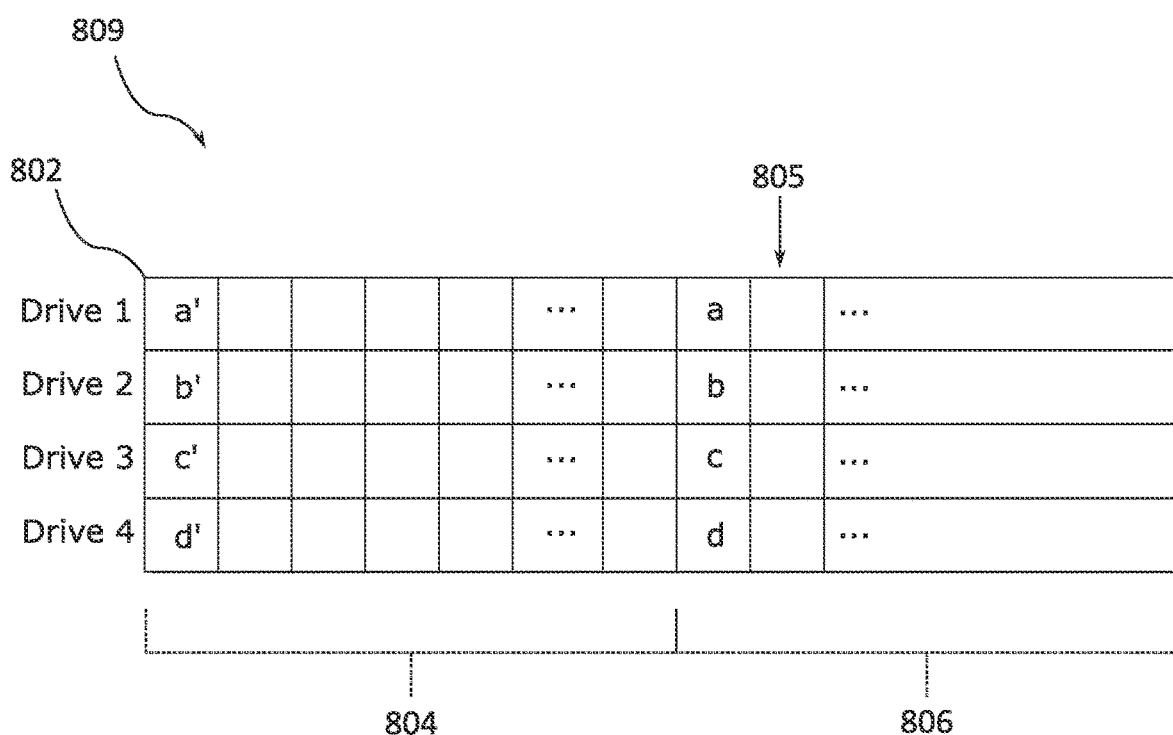
Figure 9:
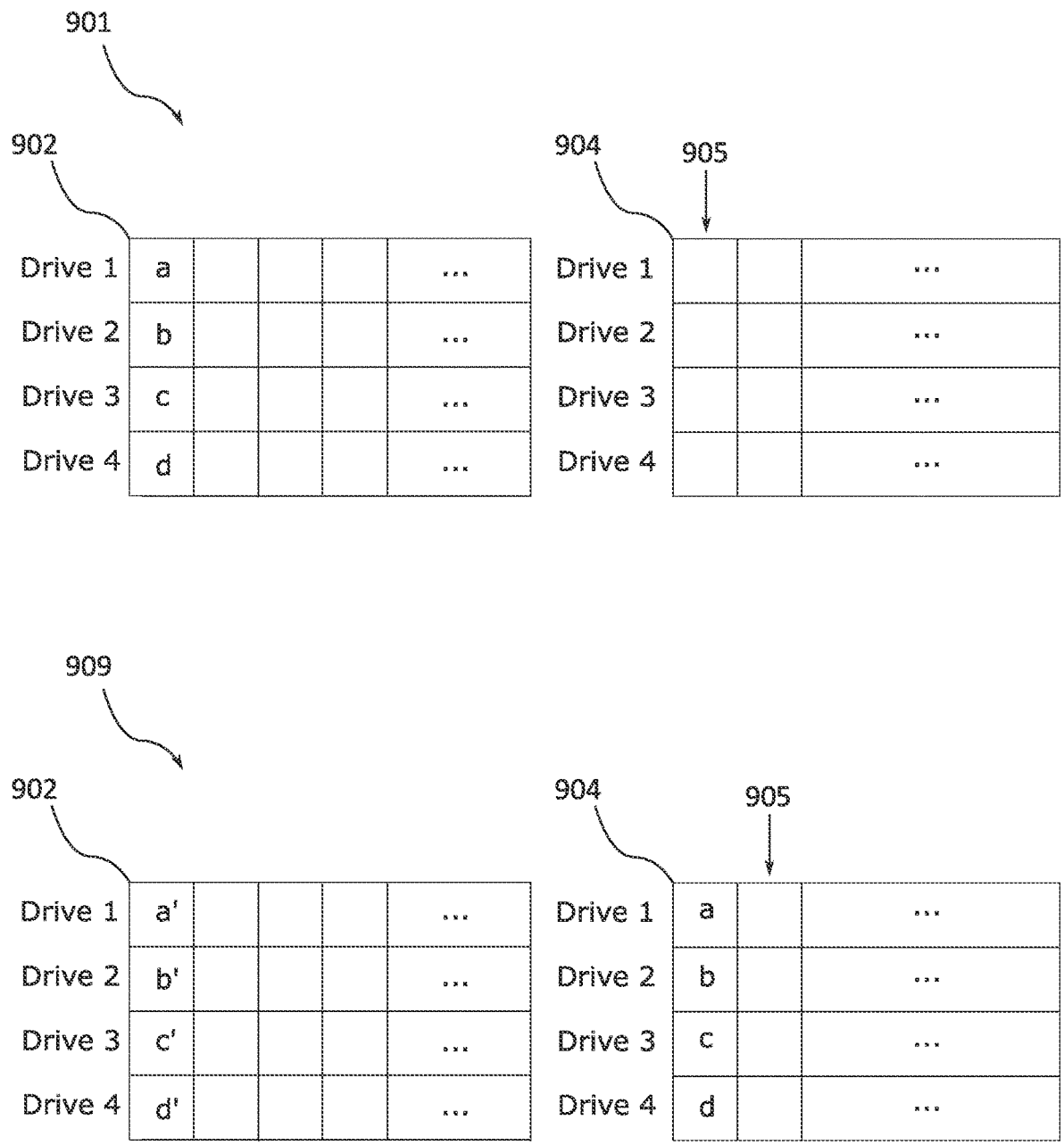
FIG. 9 shows a fourth example of data relocation for self-optimization.

FIGS. 8 and 9 illustrate third and fourth related examples of data relocation in self-optimization. They relate to the portioning of the persistent storage device described above. If the metadata determined at step 502 comprises a characteristic value for data existing in the persistent storage device, then the storage controller may relocate data based on this characteristic value.

For simplicity, array 802 of hard disk drives is shown to comprise only four drives, Drive 1, Drive 2, Drive 3, and Drive 4. However, a hard disk drive array is likely to comprise more hard disk drives in practice. Array 802 is partitioned into a first partition 804 and a second partition 806. In a different embodiment, there may be more than two partitions corresponding to different levels of speed.

State 801 shows array 802 prior to self-optimization. State 809 shows array 802 after self-optimization.

In the case that the characteristic value relates to speed, the storage controller may relocate one or more data blocks to one or more slow partitions, or one or more fast partitions based on the characteristic value of the data. If a data block has a low characteristic value, the storage controller may relocate it to a slow partition. Conversely if a data block has a high characteristic value, the storage controller may relocate it to a fast partition.

In the case that the characteristic value relates to resiliency, the storage controller may relocate one or more data blocks to either a reliable partition or a partition more prone to failure based on the characteristic value of the data. If a data block has a low characteristic value, the storage controller may write it to a partition more prone to failure. Conversely if a data block has a high characteristic value, the storage controller may write it to a more reliable partition.

The storage controller may be relocated data based on a weighted function of multiple characteristic values.

In the illustrated example of FIG. 8, the storage controller determines that data blocks a, b, c, and d are to be relocated from partition 804 to partition 806. This is achieved by first reading blocks a, b, c, and d from partition 804 into memory and then writing them as a stripe partition to the collection of addresses at 805 selected from the list of free physical locations according to steps 301 to 305. The data blocks a, b, c, and d in partition 804 are marked clean so as to indicate that the physical locations can be reused.

Unlike the example of FIG. 8, the example of FIG. 9 involves relocating data from one type of storage to another. FIG. 9 shows a partition (array) 902 of hard disk drives and a partition (array) 904 of solid-state drives. Each array comprises only four drives for simplicity. In practice, each array is likely to comprise more drives, and the persistent storage device is not limited to just two arrays.

State 901 shows partitions 902 and 904 prior to self-optimization. State 909 shows partitions 902 and 904 after self-optimization.

One or more data blocks may be relocated from partition 902 to partition 904 or from partition 904 to partition 902, depending on one or more characteristic values determined at step 502.

In the illustrated example, the storage controller determines that data blocks a, b, c, and d are to be relocated from partition 902 to partition 904. This is achieved by first reading blocks a, b, c, and d from partition 902 into memory and then writing them as a stripe to partition 904 at the collection of physical address 905 selected from the list of free physical locations according to steps 301 to 305. The data blocks a, b, c, and d in array 902 are marked clean so as to indicate that the physical locations can be reused.

Figure 10:
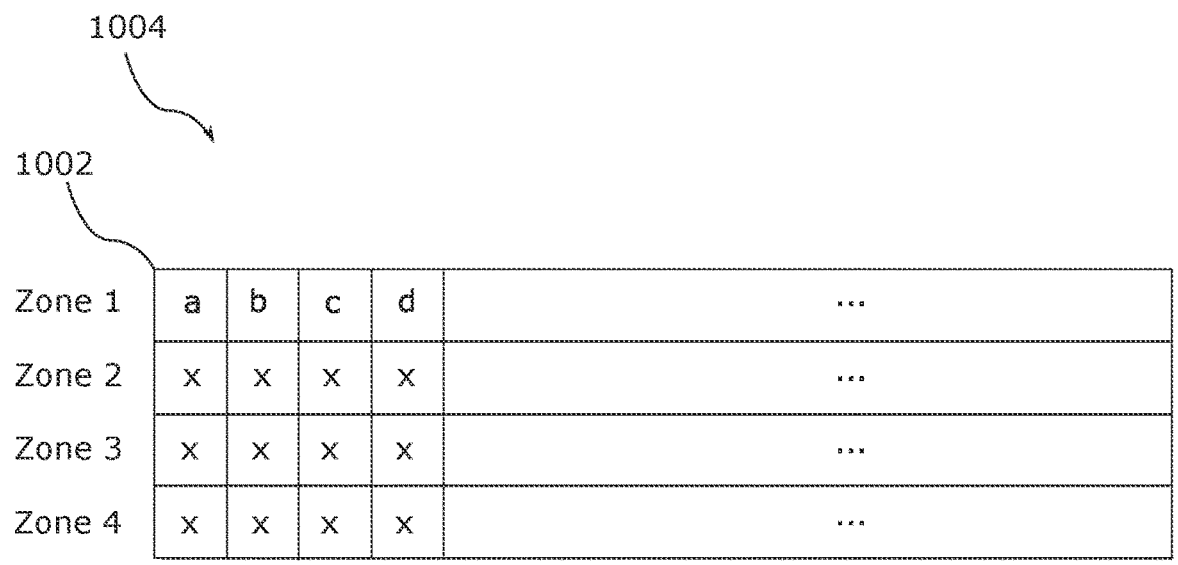
FIG. 10 shows a fifth example of data relocation for self-optimization.
Figure 10:
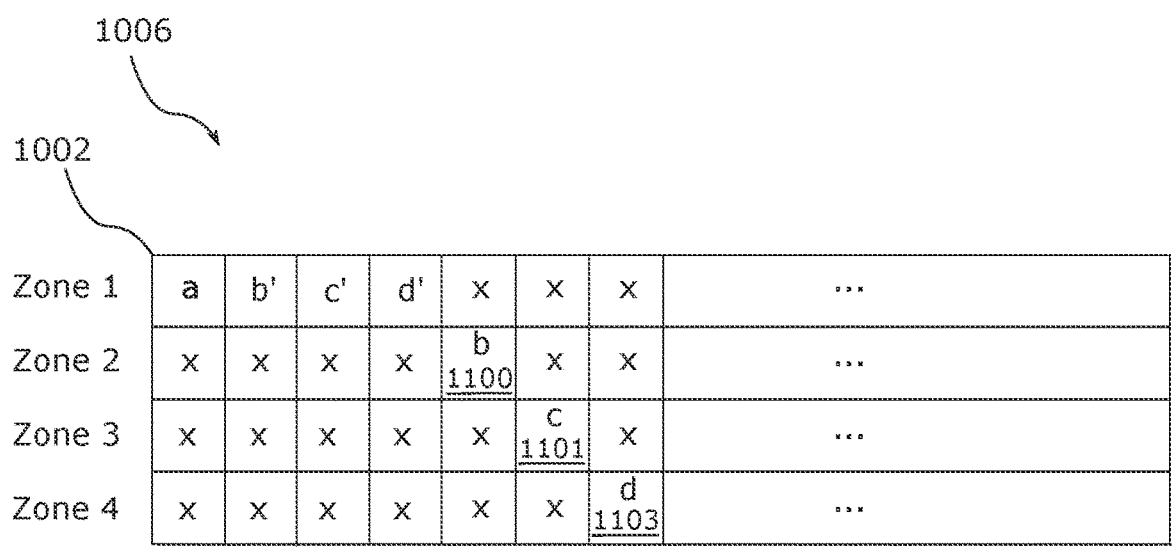

FIG. 10 illustrates a fifth example of data relocation in self-optimization. This relates to distributing data across multiple zones in a zoned drive, as previously described in relation to step 302.

In the example of FIG. 10, there is shown a zoned drive 1002 comprising only four zones, though a zoned drive may comprise a different number of zones in practice. Zoned drive 1002 may be a zoned drive of a plurality of zoned drives in the persistent storage device.

State 1004 shows zoned drive 1002 prior to self-optimization. The storage controller determines that data blocks a, b, c, and d (related data blocks) match a read pattern determined at step 502. It can be seen that the related data blocks are currently stored in Zone 1 and consequently cannot be read in parallel. Other data blocks (denoted by "x") exist in Zone 2, Zone 3, and Zone 4.

Any three or more of the related data blocks are read into memory. Data blocks b, c, and d are arbitrarily selected for ease of explanation. After data blocks b, c, and d have been read into memory, they are distributed across all Zones 2, 3, and 4 according to steps 301 to 305. In this particular case, the distribution may be achieved after three stripes have been written to the persistent storage device. In the first stripe, data block h is written to address 1100 of zoned drive 1002, which is on Zone 2. In the second stripe, data block c is written to address 1101 of zoned drive 1002, which is on Zone 3. In the third stripe, data block d is written to address 1103 of zoned drive 1002, which is on Zone 4.

State 1006 shows array 1002 after self-optimization. The related data blocks are now each stored in a different zone. This allows the related data blocks to be read in parallel, which consequently optimizes expected read performance. The addresses at which data blocks b, c, and d were previously stored in Zone 1 are marked clean so as to indicate that the physical locations can be reused.

In addition to the dedicated self-optimization processes described above, relocation of data may be combined with data writes. For example, if the storage controller determines that some related data blocks have the same affinity with incoming data blocks from a write request, the data blocks may be grouped together in memory before being sequentially written to a contiguous region in the persistent storage device.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods. Additionally, or alternatively, any of the methods may be implemented in hardware, for example as an application-specific integrated circuit (ASIC).

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

The invention claimed is:

1. A method for relocating data in a persistent storage device comprising an array of drives, wherein the array of drives comprises multiple solid-state drives, the method comprising:
   determining a condition for data relocation is met;
   determining metadata, wherein determining the metadata comprises determining an expected read pattern; and
   sequentially relocating the data, based on the metadata, from a first physical location in the persistent storage device to a second physical location different from the first physical location in the persistent storage device, the sequential relocation comprising:
      reading data matching the expected read pattern into memory; and
      distributing the data matching the expected read pattern from the memory across multiple dies on the multiple solid-state drives.

2. The method of claim 1, wherein relocating the data improves read performance.

3. The method of claim 1, wherein determining condition for data relocation is met is based on at least one of a number of gaps on the persistent storage device exceeding a first threshold; an activity level of the persistent storage device falling below a second threshold; a free capacity of the persistent storage device falling below a third threshold; and a time period having passed.

4. The method of claim 1, wherein sequentially relocating the data, based on the metadata, from the first physical location in the persistent storage device to the second physical location in the persistent storage device further comprises:
   sequentially writing the data matching the expected read pattern from the memory to a contiguous region in the persistent storage device.

5. The method of claim 1, wherein determining the metadata further comprises determining a priority value.

6. The method of claim 5, wherein the array of drives further comprises an array of hard disk drives, and wherein sequentially relocating the data, based on the metadata, from the first physical location in the persistent storage device to the second physical location in the persistent storage device further comprises:
   reading data for which the priority value was determined into the memory; and
   sequentially writing the data for which the priority value was determined from the memory to a fast zone on the array of hard disk drives.

7. The method of claim 5, wherein sequentially relocating the data, based on the metadata, from the first physical location in the persistent storage device to the second physical location in the persistent storage device further comprises:
   reading data for which the priority value was determined into the memory; and
   sequentially writing the data for which the priority value was determined from the memory to the multiple solid-state drives.

8. The method of claim 1, further comprising updating a mapping from a virtual location to the first physical location to map between the virtual location and the second physical location.

9. A storage system comprising:
   a memory;
   a persistent storage device comprising an array of drives, wherein the array of drives comprises multiple solid-state drives; and
   a storage controller configured to perform steps comprising:
      determining a condition for data relocation is met;
      determining metadata, wherein determining the metadata comprises determining an expected read pattern; and
      sequentially relocating the data, based on the metadata, from a first physical location in the persistent storage device to a second physical location different from the first physical location in the persistent storage device, the sequential relocation comprising:
         reading data matching the expected read pattern into the memory; and
         distributing the data matching the expected read pattern from the memory across multiple dies on multiple solid-state drives.

10. The storage system of claim 9, wherein relocating the data improves read performance.

11. The storage system of claim 9, wherein determining the condition for data relocation is met is based on at least one of a number of gaps on the persistent storage device exceeding a first threshold; an activity level of the persistent storage device falling below a second threshold; a free capacity of the persistent storage device falling below a third threshold; and a time period having passed.

12. The storage system of claim 9, wherein sequentially relocating the data, based on the metadata, from the first physical location in the persistent storage device to the second physical location in the persistent storage device further comprises:
   sequentially writing the data matching the expected read pattern from the memory to a contiguous region in the persistent storage device.

13. The storage system of claim 9, wherein determining the metadata further comprises determining a priority value.

14. The storage system of claim 13, wherein the array of drives further comprises an array of hard disk drives, and wherein sequentially relocating the data, based on the metadata, from the first physical location in the persistent storage device to the second physical location in the persistent storage device further comprises:

reading data for which the priority value was determined into the memory; and sequentially writing the data for which the priority value was determined from the memory to a fast zone on the array of hard disk drives.

15. The storage system of claim 13, wherein sequentially relocating the data, based on the metadata, from the first physical location in the persistent storage device to the second physical location in the persistent storage device further comprises:

reading data for which the priority value was determined into the memory; and sequentially writing the data for which the priority value was determined from the memory to the multiple solid-state drives.

16. The storage system of claim 9, wherein the storage controller is further configured to update a mapping from a virtual location to the first physical location to map between the virtual location and the second physical location.

\* \* \* \* \*